No. 860,172. PATENTED JULY 16, 1907.
J. R. & A. WELLS.
APPARATUS FOR USE IN APPLYING SURFACE MATERIAL TO BODIES.
APPLICATION FILED APR. 3, 1906.
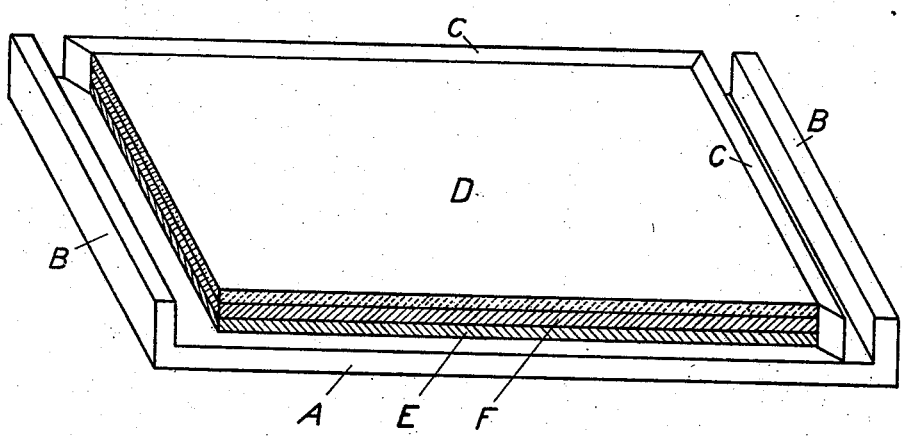
Witnesses
Knight Campbell.
Harold Campbell
Inventors
James R. Wells.
Albert Wells.
By C. D. Campbell,
Atty

UNITED STATES PATENT OFFICE.

JAMES R. WELLS AND ALBERT WELLS, OF KENTON, OHIO, ASSIGNORS OF ONE-THIRD TO JOHN W. SCOTT, OF KENTON, OHIO.

APPARATUS FOR USE IN APPLYING SURFACE MATERIAL TO BODIES.

No. 860,172.  Specification of Letters Patent.  Patented July 16, 1907.

Application filed April 3, 1906. Serial No. 309,721.

*To all whom it may concern:*

Be it known that we, JAMES R. WELLS and ALBERT WELLS, citizens of the United States, residing at Kenton, in the county of Hardin and State of Ohio, have invented a new and useful Improvement in Apparatus for Use in Applying Surface Material to Bodies, of which the following is a specification.

The present invention relates to an apparatus for use in applying surfacing material to bodies which is especially adapted for forming plaster boards.

The accompanying drawing shows the apparatus in perspective view, two sides of the frame being broken away.

The apparatus consists of a rectangular molding frame C which is open at the top and bottom and is placed on a suitable turning board A having cleats B. E is a gaging member which preferably fits snugly but loosely in the frame C and fills the lower part thereof and is supported in position by the turning board A. The gaging member E is preferably made from paper but may be made from wood, iron or other suitable material.

The use of the apparatus is as follows: The body F to be surfaced is placed in the frame C and is supported by the gaging member E in spaced relation to the upper and lower ends of the frame. The surfacing material D which is preferably in a plastic state is then filled into the frame on the top of the body F. When the frame is filled the top is struck off smooth by means of any conventional tool, the upper edges of the frame serving as striking edges. The surfacing material adheres to the body F and the operator taking hold of the board A and frame C turns them upside down onto another turning board. The surfacing material is then located lowermost in the frame and the gaging member is at the top. The gaging member is then removed and surfacing material is filled into the frame in lieu thereof, the surfacing material adhering to the body F. The frame with its contents is then set away on the board to dry.

In the drawing we have shown the gaging member E and the body F of about equal thickness, each occupying about one third of the frame E. In this way a product is formed which consists of three layers of about equal thickness, viz, a central layer F and a surfacing layer on each side thereof. It will readily be understood that the thickness of the gaging member regulates the thickness of the two surfacing layers. If, for instance, the member E was thinner the upper layer D shown in the drawing would be thicker and the other layer of the surfacing material which takes the place of the member E would be thinner.

The apparatus is especially adapted for use in making plaster-boards, in which event the body F serves as a filler for the plaster D applied to both sides thereof. The filler is then preferably made from roofing paper and the plaster is made from raw, fibrous gypsum having the natural fibers incorporated therein. This coating speedily unites with the paper and forms a practically indestructible bond.

What we claim is

1. An apparatus for forming double surfaced slabs of substantially the character described comprising a molding frame of depth corresponding to the thickness of the slab to be formed, having striking edges over which a striker may be passed in leveling the bodies of plastic surfacing material applied, and a gaging member snugly fitting the frame determining the thickness of both bodies of plastic surfacing material, adapted to support the body of the slab during the application of the first body of surfacing material and removable to permit filling, with plastic material, that portion of the mold frame first occupied by the gaging member, and thereby forming and determining the thickness of the second body of surfacing material, substantially as herein described.

2. An apparatus for forming double surfaced slabs of substantially the character described comprising a turning board, a rectangular frame, for confining the surfacing material during its application and a gaging member snugly fitting the frame adapted to support the body to be surfaced in the mold and determining the thickness of the surfacing material applied to said body substantially as described.

3. An apparatus for use in applying surfacing material to bodies to be surfaced comprising a suitable turning board, a molding frame, and a removable gage member snugly fitting the frame and adapted to determine the position in the frame of the body to be surfaced.

4. An apparatus for use in applying surfacing material to bodies, comprising a molding frame, a member adapted to temporarily support the body to be surfaced in spaced relation to both ends of the molding frame to permit one side of the body to be covered with the surfacing material and removable to permit the other side of the body to be covered with the surfacing material.

5. An apparatus for use in applying surfacing material to bodies, comprising a molding frame, a member snugly fitting the molding frame, adapted to support the body to be surfaced in spaced relation to the ends of the frame to permit one end of the frame to be filled with the surfacing material and removable to permit the other end of the frame to be filled with the surfacing material.

6. An apparatus for use in applying surfacing material to bodies, comprising a molding frame, open at both ends, a member constructed to temporarily fill one end of the frame and support the body to be surfaced in spaced relation to the ends of the frame to permit one side of the body to be covered with the surfacing material and removable to permit the other side of the body to be covered with the surfacing material.

JAMES R. WELLS.
ALBERT WELLS.

Witnesses:
  WILLIAM M. TITLOW,
  JAS. MUNCEY.